US006689955B2

(12) United States Patent
Doutaz

(10) Patent No.: US 6,689,955 B2
(45) Date of Patent: Feb. 10, 2004

(54) CONNECTING DEVICE WITH A CONNECTION SPRING OPERATED BY A CAM

(75) Inventor: Luc Doutaz, Bron (FR)

(73) Assignee: Entrelec S.A., Lyons (FR)

( * ) Notice: Subject to any disclaimer, the term of this patent is extended or adjusted under 35 U.S.C. 154(b) by 0 days.

(21) Appl. No.: 10/243,657

(22) Filed: Sep. 16, 2002

(65) Prior Publication Data

US 2003/0066673 A1 Apr. 10, 2003

(30) Foreign Application Priority Data

Sep. 20, 2001 (FR) ........................................ 01 12161
Dec. 18, 2001 (FR) ........................................ 01 16407

(51) Int. Cl.$^{7}$ ............................................. H02G 3/18

(52) U.S. Cl. ..................... 174/65 R; 174/64; 174/135; 439/828

(58) Field of Search ............................ 174/65 R, 48, 174/50, 17 R, 58, 63, 64, 60, 135, 65 G; 220/3.2, 3.3, 3.6, 3.8, 4.02; 248/906, 56; 439/535, 828, 835; 361/600

(56) References Cited

U.S. PATENT DOCUMENTS 5,929,378 A * 7/1999 Guisti ..................... 220/3.3 X
6,215,065 B1 * 4/2001 Cox ......................... 174/65 R
6,316,728 B1 * 11/2001 Hoover et al. ............ 174/65 R
6,375,129 B2 * 4/2002 Koziol ................. 174/65 R X
6,444,907 B1 * 9/2002 Kiely ....................... 174/65 R
6,462,275 B1 * 10/2002 Daoud ...................... 248/56 X
6,521,833 B1 * 2/2003 DeFreitas ................. 174/65 R

FOREIGN PATENT DOCUMENTS

DE 43 32 969 C1 7/1994
DE 195 29 028 A1 1/1997
DE 196 11 762 A1 10/1997
DE 198 34 681 C1 5/2000

* cited by examiner

*Primary Examiner*—Dhiru R Patel
(74) *Attorney, Agent, or Firm*—Oliff & Berridge, PLC

(57) ABSTRACT

The device includes an insulating casing defining at least one connecting housing and, in each connecting housing, an interconnection piece arranged in the casing and provided with at least one connecting branch, a connecting spring, a cam for compressing the spring to uncover the connection opening, and to allow the conductor for connecting to be introduced. The cam which is fitted into the connecting housing so as to be able to move in terms of rotation between a start of travel corresponding to the spring being in a relaxed state and an end of travel corresponding to the spring being in a compressed state, and which is provided with an operating lever extending at least partially out of the casing to allow the cam to be operated between the start and the end of travel and which has a cam path includes on the one hand, a zone known as the dead zone, through which the cam can pivot from the start of travel without acting on the spring and, on the other hand, a zone known as the active zone, following on from the dead zone. The device also includes rib and stalks slowing the rotation of the cam in the start-of-travel and end-of-travel position.

16 Claims, 6 Drawing Sheets

CONNECTING DEVICE WITH A CONNECTION SPRING OPERATED BY A CAM

FIELD OF THE INVENTION

The invention relates to the technical field of connecting devices for at least one electric conductor employing, to immobilize the connected conductor, a loop-shaped connection spring.

DESCRIPTION OF THE PRIOR ART

In the above field, it is known practice to employ junction blocks such as those described in application DE-195 29 028 or printed circuit connection blocks as described in application DE-196 11 762 or alternatively in application DE-198 34 681.

According to those various documents, the connecting device comprises an insulating casing defining at least one connecting housing for an electric conductor. The device therefore comprises, in each connecting housing:

- an interconnection piece provided with at least one connecting branch,
- a looped connecting spring comprising in succession a bearing branch arranged on the connecting branch of the interconnection piece, an elbow connecting the bearing branch to an operating back piece, and a connection branch extending the operating back piece on the opposite side to the elbow towards the bearing branch and exhibiting a connection opening intended to accommodate the electric conductor to press it against the interconnection piece, the compression means comprising a cam which is fitted into the connecting housing so as to be able to move in terms of rotation between a start of travel corresponding to the spring being in a relaxed state and an end of travel corresponding to the spring being in a compressed state, and which is provided with an operating lever extending at least partially out of the casing to allow the cam to be operated between the start and the end of travel and which has a cam path comprising, on the one hand, a zone known as the dead zone, through which the cam can pivot from the start of travel without acting on the spring and, on the other hand, a zone known as the active zone, following on from the dead zone, in which the cam gradually compresses the spring as it rotates towards the end of travel.

Such devices are entirely satisfactory in their function of connecting an electric conductor in a way which is electrically reliable and mechanically strong. However, the very design of the cam does not allow the cam to be given a stable position, particularly at the start and end of the travel.

Hence there has arisen a need for a novel type of connecting device which employs spring-compressing means which do not entail exerting an excessively high force in order to compress the spring and which are easier to use than the bistable rocker lever systems of the prior art, while at the same time preventing unwanted cam movements.

SUMMARY OF THE INVENTION

To this end, according to the invention, the device is essentially one which comprises means of slowing the rotation of the cam in the start-of-travel and/or end-of-travel position.

According to a preferred embodiment, the lever is situated against the casing when the cam is at the start of its travel, the spring being relaxed. Thus, the dead zone defines part of the cam travel during which it is possible for the cam and the lever to be moved without effort. This dead travel therefore allows the operating lever to be moved away from the casing so as to gain sufficient purchase to be able, comfortably and without the risk of injury on the lever, to exert the force needed to compress the spring using the cam.

According to another feature of the invention, the cam path is designed so that the cam is in a stable position at every point in the active zone. This provision of the invention therefore spares a user of the device the need to fully compress the spring in each connecting operation. Indeed, in certain situations, depending on the size of the electric conductor that is to be connected, it is not always necessary to fully compress the spring in order to engage the conductor in the connection aperture of the spring.

According to another advantageous feature of the invention, the cam has at least one test channel offering access to the connecting spring. As a preference, though this is not strictly necessary, the channel is designed to give at least one way of accessing the connecting spring when the spring is in the relaxed position corresponding to the start of cam travel. Thus, it is possible, through the test channel, to offer up a conductor element of a measurement device into contact with the spring in order, for example, to check whether or not there is electrical voltage at the spring and therefore at the interconnection piece.

According to another feature of the invention, the cam pivots through half a turn between the start and end of travel. This arrangement makes it possible, when the cam has a test channel, to use the same channel for measurements whether the cam is in the start of travel position or the end of travel position.

According to the invention, the casing and the cam are connected by a pivot link which may be produced in any appropriate way such as in the form of a through-pin for example, arranged both in a bore in the cam and in two complementary bores in the casing. The cam could also have a central bore intended to engage with a pin secured to the casing. However, according to a preferred embodiment of the invention, the cam comprises two lateral pivots intended to engage in two complementary bearings belonging to the casing. When the pivot link between the cam and the casing is produced in such a way, the slowing means then comprise at least two complementary shapings formed respectively on a pivot and on the corresponding bearing. The complementary shapings of the pivot and of the bearing are then designed to cooperate at least when the cam is in the start-of-travel position.

According to another arrangement of the invention aimed at simplifying the operations of mounting and assembling the connecting device, the insulating casing comprises two half-bodies known as the front and rear half-bodies. The front half-body therefore delimits at least one connecting housing and comprises a connecting facade in which at least one passage is formed for the conductor that is to be connected, and, on the opposite side to the facade, an opening for mounting the interconnection piece and the spring together with the cam.

The rear half-body is also intended to be fitted to the front half-body to close the connecting housing and immobilize at least the interconnection piece, the connecting spring and the cam.

This embodiment of the insulating casing makes it possible, in a very advantageous way, to install the various constituent parts of the device from the rear of the front casing, then to close the latter using the rear half-casing which then immobilizes the components of the device in the insulating casing.

To make the cam-mounting operations easier still, the front half-body defines two half-bearings for accommodating the cam pivots, each half-bearing being open towards the rear and comprising a semi-cylindrical part extended, in the opposite direction to a space for accommodating the spring, by a bearing stop which is roughly flat and tangential to the cylindrical part. The rear half-body therefore defines two half-bearings that complement the half-bearings of the front half-body to form the two bearings that accommodate the cam pivots.

Similarly, in order to allow the interconnection piece to be fitted into the connecting housing from the rear of the front half-casing, the connecting branch of the interconnection piece is roughly flat and has a width that exceeds the width of the remainder of the interconnection piece. The insulating casing therefore defines two lateral stops for reacting the forces exerted on the connecting branch by the connecting spring as it is compressed.

According to a preferred embodiment, the reaction stops are formed by flanges of the rear half-body which are intended to engage with the connecting branch as the two half-bodies of which the insulating casing is made are assembled.

The connecting device according to the invention may constitute various types of device such as, for example, an interconnection unit. To this end, the interconnection piece may be equipped with several spring-loaded connecting systems or systems for connecting miscellaneous conductor elements.

According to a preferred and not strictly necessary embodiment, the connecting device is intended to allow the quick connecting of electrical conductors such as electrical cables to a printed circuit board. The interconnection piece therefore comprises a stalk extending out from the casing for connection to the printed circuit.

According to a preferred embodiment, the stalk extends roughly at right angles to the connecting branch and is connected to the connecting branch by a linking branch which, as it extends from the connecting branch, is first of all bent against the connecting branch, then moves away from the connecting branch to define a stop for an electrical cable engaged in the connecting housing.

According to another feature of the invention, the casing comprises a measurement channel offering access to the interconnection piece.

According to another feature of the invention, the connecting branch of the interconnection piece has, at the opposite end to its free end, an interconnection aperture and the casing has an interconnection channel for fitting an interconnection plug into the interconnection aperture.

BRIEF DESCRIPTION OF THE DRAWINGS

Various other features of the invention will become apparent from the description herein below given with reference to the appended drawings which illustrate various non-limiting embodiments of a connecting device according to the invention.

DESCRIPTION OF THE PREFERRED EMBODIMENTS

Figure 1:
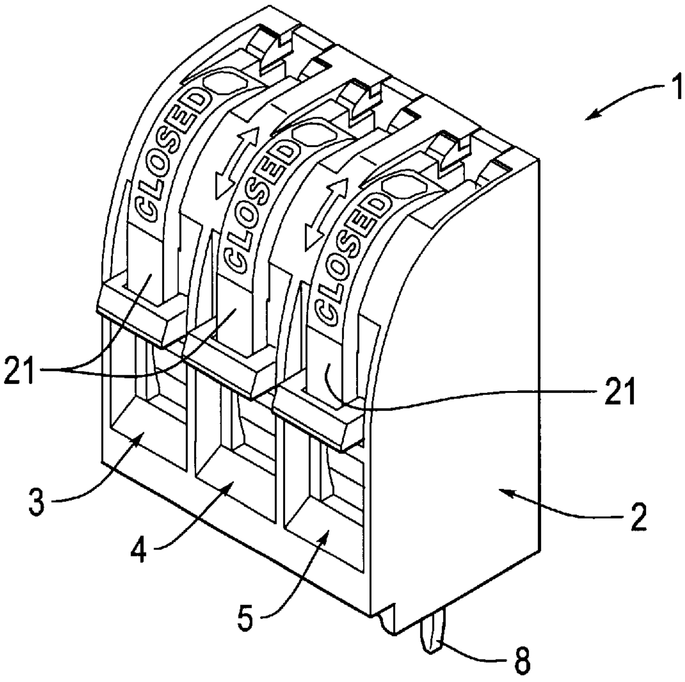
FIG. 1 is a perspective view illustrating a first embodiment of a connecting device according to the invention.

A connecting device according to the invention, as denoted in its entirety by the reference 1 in FIG. 1, comprises an insulating casing 2 defining at least one and, according to the example illustrated, three housings 3, 4, 5 for connecting the electric conductors, in numbers of at least one per housing.

Figure 2:
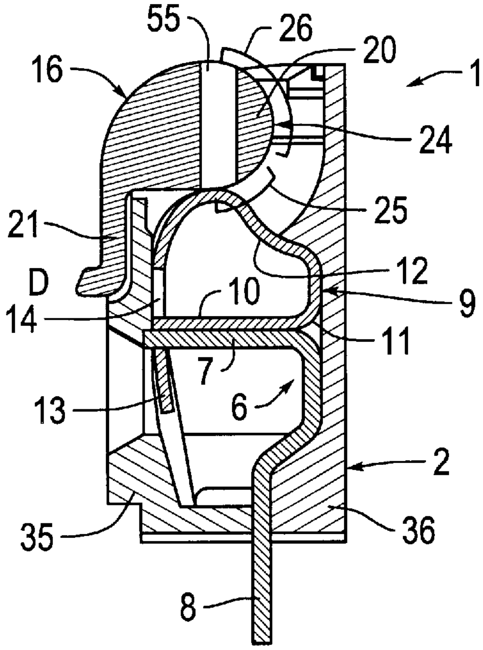
FIG. 2 is a cross section through a connecting housing of the device illustrated in the FIG. 1.
Figure 3:
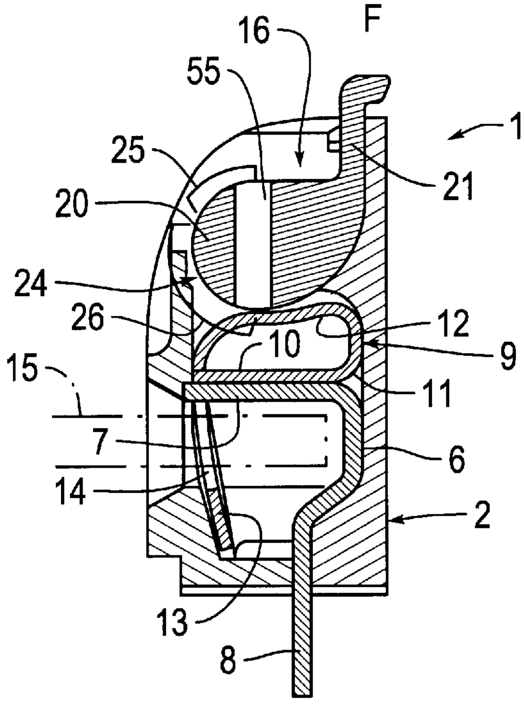
FIG. 3 is a section similar to FIG. 2, showing the connecting device with its connection spring in a compressed state.

As shown by FIGS. 2 and 3, the connecting device 1 comprises, in each housing, an interconnection piece 6 provided with at least one connecting branch 7. According to the example illustrated, the connecting device 1 is designed be fitted to a printed circuit. Thus, each interconnection piece 6 comprises a stalk 8 roughly perpendicular to the branch 7 and intended to project out from the casing to be inserted in a complementary orifice made in the printed circuit, not depicted.

The device also comprises, in each housing, a connecting spring 9 which is in the form of a loop. The spring 9 comprises in succession, a bearing branch 10 arranged on or against the connecting branch 7, an elbow 11 connecting the bearing branch 10 to an operating back piece 12. The spring 9 also comprises a connection branch 13 extending the operating back piece 12 in the opposite direction to the elbow 11 and towards the bearing branch 10. The connection branch 13 also has a connection opening or aperture 14 intended to accommodate an electric conductor 15 as illustrated in chain line in FIG. 3. In a way known per se, the spring 9 is intended to press the conductor 15 against the interconnection piece 6 and more particularly against that face of the connecting branch 7 which is turned away from the bearing branch 10 of the spring 9.

The connecting device 1 further comprises, to correspond with each connecting housing, means 16 for pressing the spring 9 so as to uncover the connection opening 14 and allow the conductor 15 to be introduced as shown in FIG. 3.

The compression means 16 comprise a cam 20 which is fitted into the connection housing of the casing 1 so that it can move in rotation between the start-of-travel position D as illustrated in FIG. 2, in which position the spring 9 is relaxed or is not stressed by the cam 20, and an end-of-travel position F, as illustrated in FIG. 3, in which the spring 9 is compressed. The cam 20 is provided with an operating lever 21 which, at least partially, extends outside the casing to allow the cam 20 to be moved between its start-of-travel D and end-of-travel F positions.

In order to reduce the bulk of the device 1 as far as possible, the lever 21 is fitted to the cam 20 in such a way as to be pressed against the casing 2 in the start-of-travel position D, corresponding to the spring 9 being in the relaxed state.

To allow the lever 21 to be disengaged in order to make it easier to grasp at the start of travel, the cam 20 has a cam path 24 which comprises, on the one hand, a zone 25 known as the dead zone, through which the cam 20 can pivot from the start of travel D without acting on the spring 9 and, on the other hand, an active zone 26 following on from the dead zone 25 and in which the cam 20 gradually compresses the spring 9 as it rotates towards the end of travel D. The dead zone 25 may therefore be the result either of a particular cam profile or of there being a predetermined amount of clearance between the cam 20 and the back piece 11 of the spring 9 at the start of travel. The presence of the dead zone 25 in the cam path 24 has the advantage of allowing the lever 21 to disengage from the insulating casing 2 without the need to apply much force to the lever 21 to then start to rotate the cam 20 using the lever 21.

According to a preferred but not strictly necessary characteristic of the invention, the cam path 24 is designed so that the cam 20 is in a stable position at every point in the active zone 26. This arrangement of the inventor makes it possible to ensure that the spring is compressed by applying a gradual jerk-free force to the lever 21. In addition, in that the cain 20 is stable at every point in its travel along the active zone 26 of the cain pat 24, it is possible to keep the spring 9 in the partially compressed position without action on the lever 21. This possibility is particularly beneficial when, for example, the dimensions of the electric conductor that is to be connected do not require the connection aperture 14 to be completely uncovered.

Figure 4:
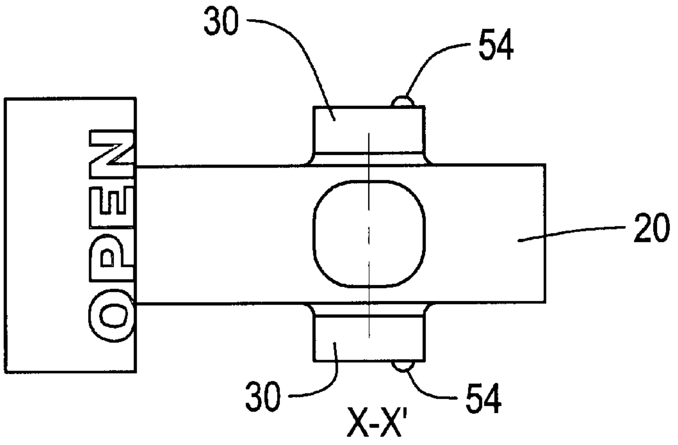
FIGS. 4 and 5 are elevations respectively from beneath and from the side of a cam and of its operating lever that make up the means for compressing the connection spring illustrated in FIGS. 1 to 3.
Figure 5:
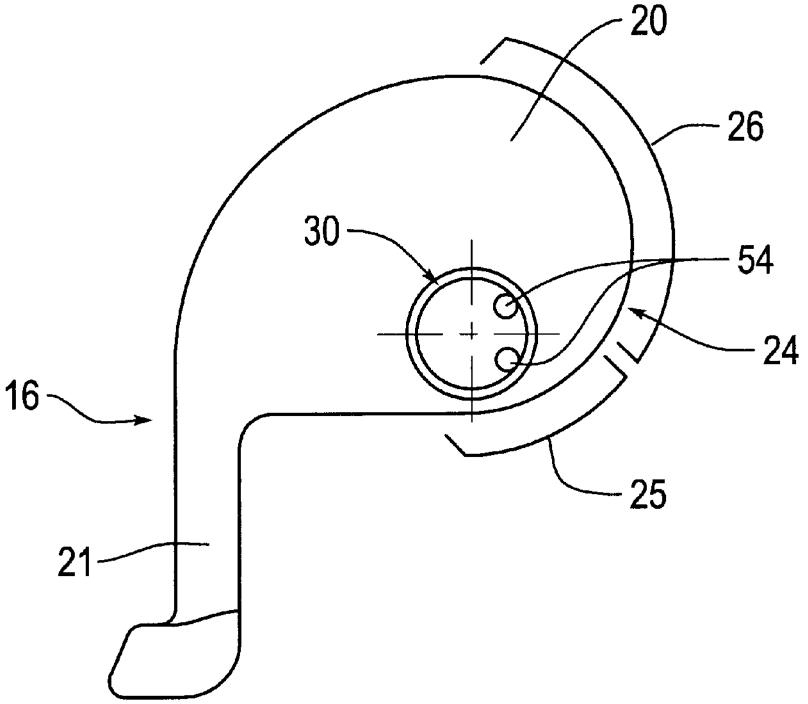
Figure 6:
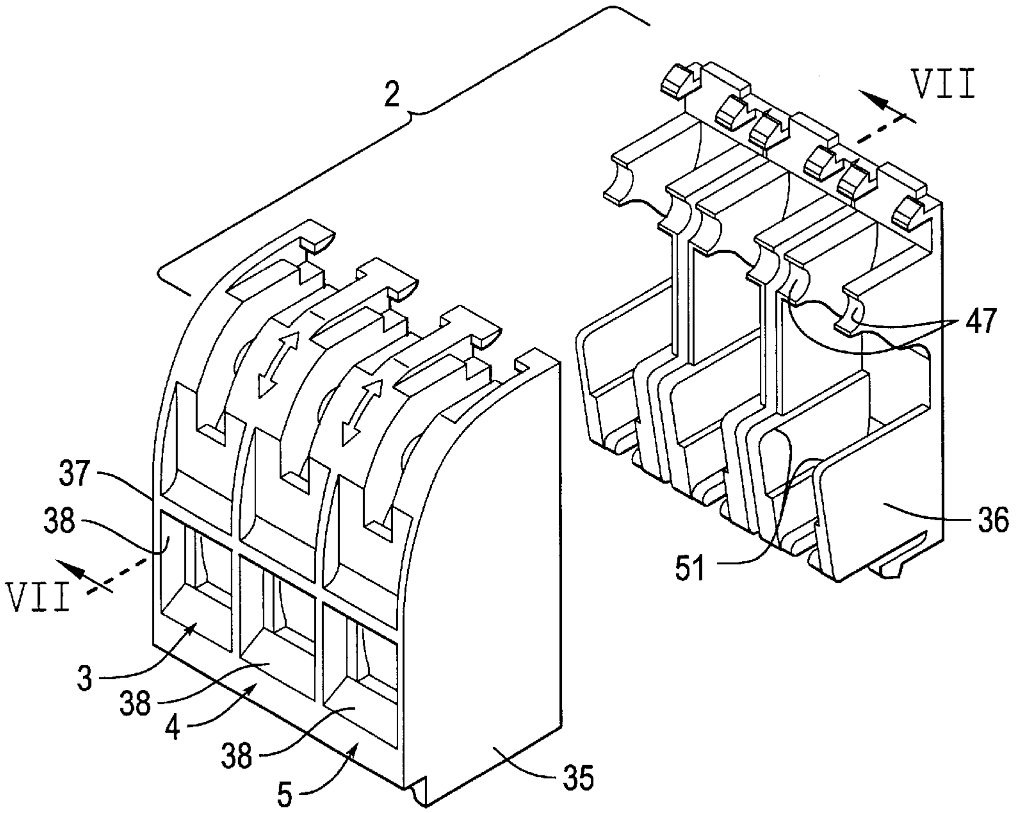
FIG. 6 is an exploded perspective view showing a preferred embodiment of the insulating casing of the connecting device according to the invention made as two half-bodies.

According to the invention, the cam 20 and the lever 21 together with the pivot link between the casing 2 and the cam 20 may be produced in any appropriate way. However, according to a preferred embodiment of the invention, the cam 20 comprises two lateral pivots 30 extending on each side of the cam 20 as shown by FIGS. 4 to 6. Each pivot 30 has a shape which is roughly cylindrical of revolution of axis X–X'. The pivots 30 of the cam 20 are therefore intended to be engaged in two complementary bearings belonging to the casing.

Figure 7:
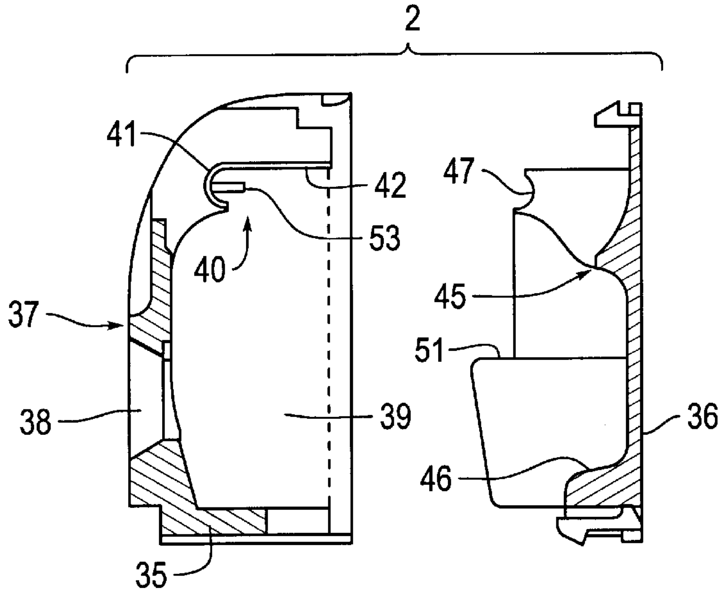
FIG. 7 is a section on VII—VII of FIG. 6.

According to a preferred embodiment of the device according to the invention, the casing 2 comprises two half-casings, a front one 35 and a rear one 36, respectively, as illustrated more particularly in FIGS. 6 and 7. According to the example illustrated, the front half-body 35, which bounds the three connecting housings 3, 4 and 5, comprises a connecting facade 37 in which there is formed, for each housing, a passage 38 for the conductor for connecting 15. The front half-body 35 also has, on the opposite side to the facade 37, an opening 39 for mounting, in each of the housings 3 to 5, the interconnection piece 6 and the spring 9 together with the cam 20. For this, the front half-body 35 comprises, in the side walls of each of the housings, two half-bearings 40 for accommodating the pivots 30 of the cam. According to the example illustrated, each half-bearing 40 comprises a semi-cylindrical part 41, open toward the rear of the half-body 35 and extended, in the direction leading away from the space accommodating the spring 9, by a bearing stop 42 which is roughly flat and tangential to the semi-cylindrical part 41.

Furthermore, the rear half-body 36 is intended to be fitted to the front half-body 35 in such a way as to close each connecting housing and comprises indentations 45, 46 for immobilizing in particular the interconnection piece 26 and the spring 9. In addition, the rear half-body 36 comprises, for each housing, two half-bearings 47 that complement the half-bearings 40 of the front half-body 35 to form the two bearings that accommodate the pivots of the cam 20.

The connecting device 1 according to the invention is assembled by placing the pivots 30 of the cam in the two half-bearings 40 of the front half-body 35, arranging the spring 9 and the interconnection piece 6 on the rear half-body 36, and engaging the rear half-body 36 in the front half-body 35 so as to reclose the accommodating housings 3–5 which will all have been equipped in the same way.

Figure 8:
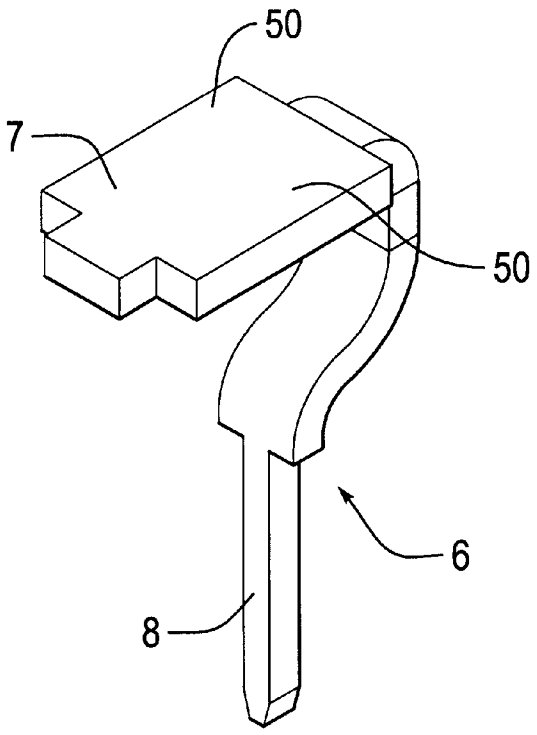
FIG. 8 is a perspective view of an interconnection piece that makes up the connecting device as illustrated in FIGS. 1 to 7.
Figure 9:
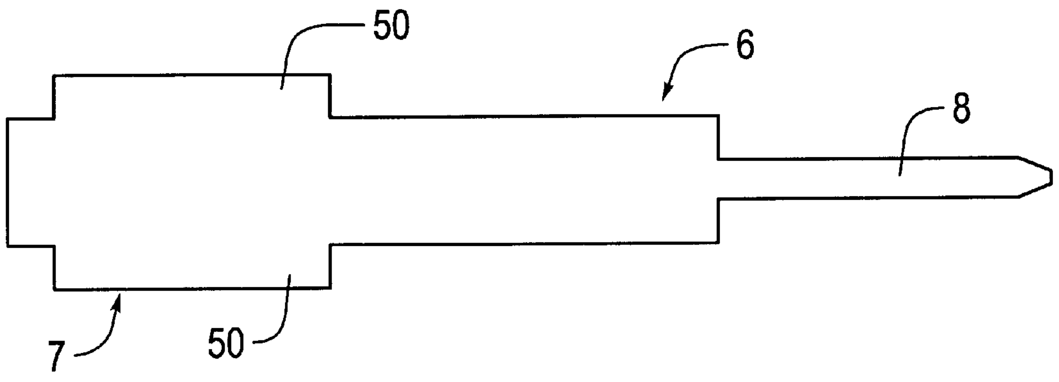
FIG. 9 is a developed view of the interconnection piece of FIG. 8.

According to the invention, in order to allow such assembly while at the same time offering good resistance to the forces of compression of the spring 9, the connecting branch 7 of the interconnection piece 6 is roughly flat and has a width greater than that of the remainder of the interconnection piece, as shown in FIGS. 8 and 9. Thus, the connecting branch comprises two lateral flanges 50 which are intended to bear against two lateral stops 51 formed in each of the connecting housings of the insulating casing 2. The stops 51 therefore react to the forces exerted by the connecting spring 9 as it is compressed against the connecting branch 7 by the cam 20.

As a preference, the stops 51 are formed by flanges of the rear half-body 36 which are intended to be engaged against the connecting branch after the two half-bodies 35, 36 of which the insulating casing 2 is made are assembled.

Furthermore, it must be pointed out that, in that the cam 20, starting out from its initial position D, has a dead travel, the cam 20 and the lever 21 can oscillate freely in the vicinity of this position D under the effect of vibrations, for example. In order to prevent such movements, the invention proposes, according to an essential feature, the use, by way of slowing means, nearly at least one pivot 30 and its corresponding bearing, of at least two shapings 53, 54 intended to collaborate at least in the start-of-travel position D to slow the movements of the cam 20. In the example illustrated, a rib 53 is formed at the bottom of the half-bearings 40, on each side of which rib there are two stalks 54 formed at the end of each pivot 30. Thus, when the cam 20 starts to turn, the stalks 54 come into abutment with the rib 53 which means that it is necessary to apply a slight force in order to cause the cam to pivot. In addition, according to the example illustrated, the stalks 54 and the ribs 53 perform this same slowing function in the end-of-travel position F.

According to an advantageous feature of the invention, the cam 20 also has a test channel 55 allowing access to the spring 9 by means for example of a conducting plug of a test device. In addition, in the example illustrated, the cam 20 passes from its start-of-travel position D to its end-of-travel position F through half a revolution, the same test channel 55 allows measurements to be made both when the spring 9 is in the relaxed position and when the latter is in its compressed position, as shown respectively in FIGS. 2 and 3.

However, in that the material of which the connection spring 9 is made does not always have optimum conducting properties, it may seem desirable to take measurements at the interconnection piece.

Figure 10:
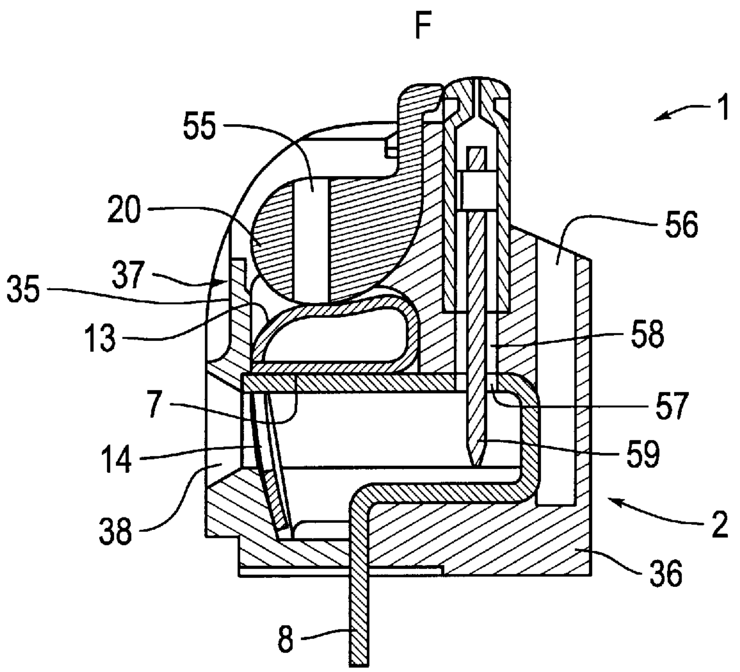
FIG. 10 is a cross section of another embodiment of a connecting device according to the invention comprising a measurement channel for accessing the interconnection piece and of the means for fitting an interconnection comb.

Thus, FIG. 10 illustrates an alternative form of embodiment of the device according to the invention, whereby the insulating casing 2 has a channel 56 for access to the interconnection piece 6, by means for example of a conducting plug of a measurement appliance. According to the example illustrated, this measurement channel 56 is formed in the rear half-body 36.

Furthermore, according to the example of FIG. 10, the connecting device 1 is designed to allow interconnection between adjacent connecting housings.

To this end, the connecting branch of each interconnection piece 6, arranged in the connecting housings, has, at the opposite end to its free end, an interconnection aperture 57. The insulating casing 2 then has an interconnection channel 58 for fitting an interconnection plug 59 into the interconnection aperture, as illustrated in FIG. 10.

Figure 11:
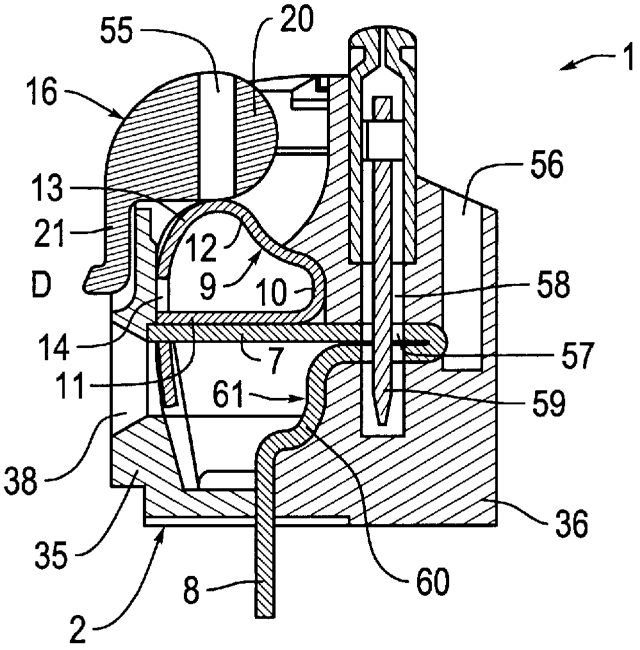
FIG. 11 is a cross section showing an alternative form of embodiment of the connecting device as illustrated in FIG. 10.
Figure 12:
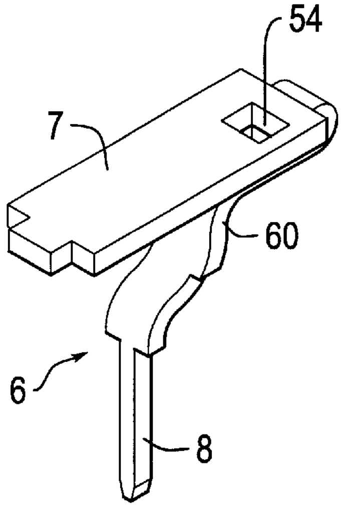
FIG. 12 is a perspective view of an interconnection piece used in the context of the connecting device according to the invention illustrated in FIG. 11.

FIGS. 11 and 12 illustrate one particular form of embodiment of the connecting device of FIG. 10, whereby the stalk 8 extends roughly at right angles to the connecting branch 7 and is connected to the connecting branch by a linking branch 60 which, as it extends from the connecting branch, is first of all bent back against the connecting branch 7, then moves away from the connecting branch 7 to define, as shown in FIG. 11, a stop 61 for an electric conductor engaged in the connecting housing.

Figure 13:
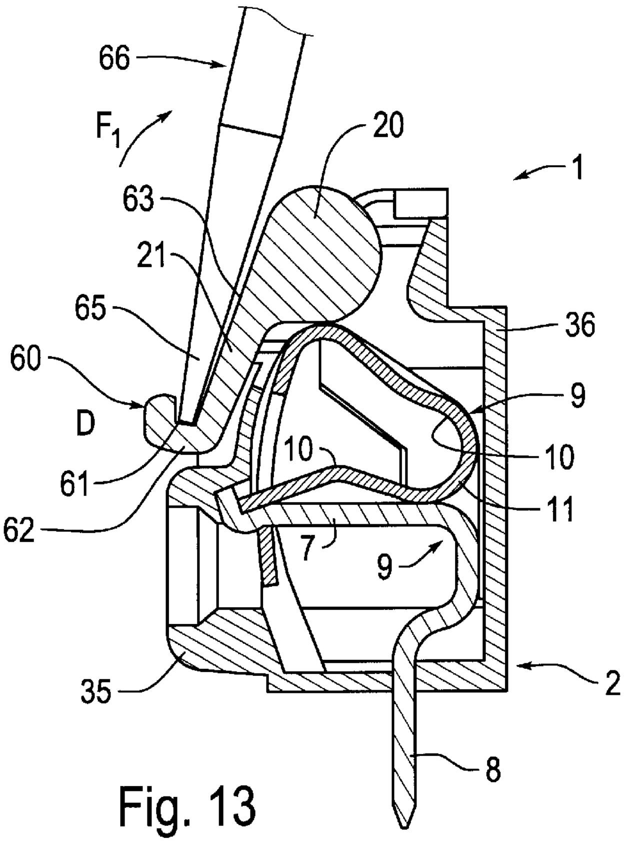
FIGS. 13 and 14 are views similar respectively to FIGS. 2 and 3, showing an alternative form of embodiment of a connecting device according to the invention.
Figure 14:
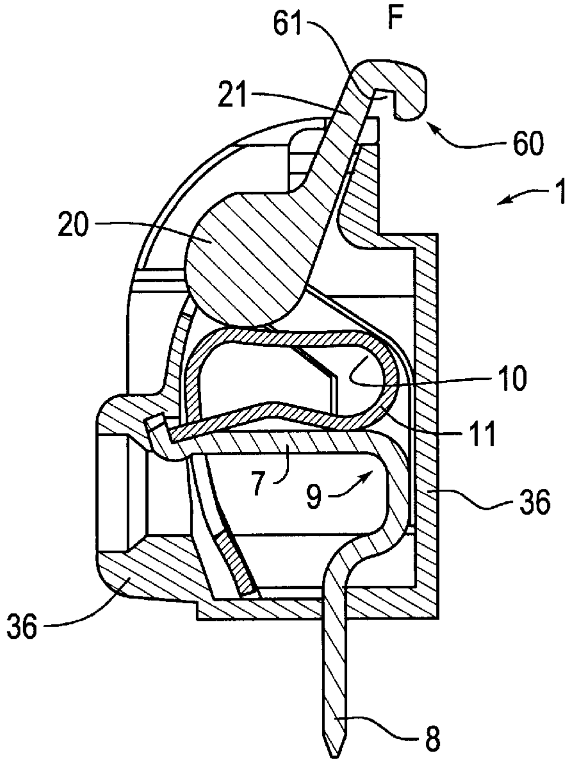

FIGS. 13 and 14 illustrate another form of embodiment of the connecting device according to the invention, whereby the lever 21 comprises means 60 for fitting a tool intended to allow the lever 21 and the cam 20 to be moved from the start-of-travel position D.

According to the example illustrated, the means 60 comprise an open housing or groove 61, formed at the free end 62 of the lever 21, so as to lie in the continuation of the back piece 63 of the lever 21 and be accessible when the lever 21 is in the start-of-travel position D.

It is thus possible to introduce into the housing 61, the blade 65 of a screwdriver 66 which then forms a lever arm to pivot the cam 20 in the direction of the arrow F1. This provision of the invention then makes it possible to have a greater lever arm to begin to turn the cam 20 and to compress the spring 9.

When this compression is begun, it is then possible to withdraw the screwdriver 66 and complete the turning of the cam 20 simply using the lever 21 to place it in the end-of-travel position F as illustrated more particularly in FIG. 14.

According to the examples described earlier, the connecting device constitutes a system intended to be fitted to a printed circuit. However, the connecting device according to the invention could constitute an entirely different system such as, by way of non-limiting example, a plug-in connector or alternatively a junction and connecting block.

Of course, the invention is not restricted to the examples described herein above and various modifications can be made thereto without departing from its scope.

What is claimed is:

1. A connecting device for at least one electric conductor comprising:

an insulating casing or body defining at least one connecting housing, the at least one connecting housing including:

an interconnection piece arranged in the casing and provided with at least one connecting branch, a looped connecting spring comprising in succession: a bearing branch arranged on the connecting branch of the interconnection piece, an elbow connecting the bearing branch to an operating back piece and a connection branch extending the operating back piece on the opposite side to the elbow towards the bearing branch and exhibiting a connection opening intended to accommodate the electric conductor to press it against the interconnection piece, means for compressing the connecting spring to uncover the connection opening and allow the electric conductor that is to be connected to be introduced, the means for compressing a cam which is fitted into the at least one connecting housing so as to be able to move in terms of rotation between a start of travel position corresponding to the connecting spring being in a relaxed state and an end of travel position corresponding to the connecting spring being in a compressed state, and the cam is provided with an operating lever extending at least partially out of the casing to allow the cam to be operated between the start and the end of travel positions and which has a cam path comprising, on the one hand, a zone known as the dead zone, through which the cam can pivot from the start of travel position without acting on the connecting spring and, on the other hand, a zone known as the active zone, following on from the dead zone, in which the cam gradually compresses the connecting spring as it rotates towards the end of travel position, which the device comprises means of slowing the rotation of the cam in the start-of-travel position and end-of-travel position, the means of slowing the rotation of the cam includes a rib and stalks.

2. The connecting device as claimed in claim 1, wherein the cam path is designed so that the cam is in a stable position at every point in the active zone.

3. The connecting device as claimed in claim 1, wherein the cam has at least one test channel offering access to the connecting spring.

4. The connecting device as claimed in claim 1, wherein the cam pivots through half a turn between the start and the end of travel positions.

5. The connecting device as claimed in claim 1, wherein the cam comprises two lateral pivots intended to be engaged in two complementary bearings of the casing.

6. The connecting device as claimed in claim 5, wherein the means of slowing further comprises at least two complementary shapings formed respectively at a pivot and at its corresponding bearings of the casing and which are intended to cooperate at least when the cam is in the start-of-travel position.

7. The connecting device as claimed in claim 1, wherein the insulating casing comprises two half-bodies, known as the front and rear half-bodies:

the front half-body delimiting the at least one connecting housing and comprising a connecting facade in which at least one passage is formed for the electric conductor that is to be connected, and, on the opposite side to opposite the facade, an opening for mounting: the interconnection piece, the connecting spring and the cam, the rear half-body being intended to be fitted to the front half-body to close the at least one connecting housing and immobilize at least the interconnection piece, the connecting spring and the cam.

8. The connecting device as claimed in claim 7, wherein:

the front half-body defines two half-bearings for accommodating pivots of the cam, each half-bearing comprising a semi-cylindrical part extending in the opposite direction to a space for accommodating the connecting spring, by a bearing stop which is approximately flat and tangential to the semi-cylindrical part, and the rear half-body defines two half-bearings that complement the two half-bearings of the front half-body to form the two bearings of the front and rear half-bodies that accommodate the pivots of the cam.

9. The connecting device as claimed in claim 1, wherein:

the connecting branch of the interconnection piece is roughly flat and has a width that exceeds a width of the remainder of the interconnection piece, and the insulating casing defines two lateral stops for reacting the forces exerted, on the connecting branch, by the connecting spring as it is compressed.

10. The connecting device as claimed in claim 9, wherein the lateral stops are formed by flanges of the rear half-body which are intended to engage with the connecting branch as two half-bodies of which the insulating casing is made are assembled.

11. The connecting device as claimed in claim 1, wherein the interconnection piece comprises a stalk extending out from the casing, for connection to a printed circuit.

12. The connecting device as claimed in claim 11, wherein the stalk of the interconnection piece extends roughly at right angles to the connecting branch and is connected to the connecting branch by a linking branch, which as the linking branch extends from the connecting branch, is bent against the connecting branch, and then moved away from the connecting branch to define a stop for the electric conductor that is engaged in the at least one connecting housing.

13. The connecting device as claimed in claim 1, wherein the casing comprises a measurement channel offering access to the interconnection piece.

14. The connecting device as claimed in claim 1, wherein the connecting branch of the interconnection piece has, at the opposite end to its free end, an interconnection aperture and the casing has an interconnection channel for fitting an interconnection plug into the interconnection aperture.

15. The connecting device as claimed in claim 1, wherein the operating lever comprises means for fitting a tool intended to allow the operating lever to be moved from the start-of-travel position.

16. The connecting device as claimed in claim 15, wherein the means for fitting the tool comprises an open housing formed at the free end of the operating lever, so as to lie in the continuation of the back piece of the operating lever and be accessible when the operating lever is in the start-of-travel position.

* * * * *